(12) United States Patent
Murakami et al.

(10) Patent No.: US 12,472,871 B2
(45) Date of Patent: Nov. 18, 2025

(54) DISPLAY CONTROL DEVICE AND DISPLAY CONTROL METHOD

(71) Applicant: Faurecia Clarion Electronics Co., Ltd., Saitama (JP)

(72) Inventors: Tetsuro Murakami, Saitama (JP); Naoto Sakata, Saitama (JP); Masashi Koga, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 144 days.

(21) Appl. No.: 18/534,456

(22) Filed: Dec. 8, 2023

(65) Prior Publication Data

US 2024/0208413 A1   Jun. 27, 2024

(30) Foreign Application Priority Data

Dec. 27, 2022   (JP) ................. 2022-210493

(51) Int. Cl.
| | |
|---|---|
| *B60R 1/00* | (2022.01) |
| *B60R 1/28* | (2022.01) |
| *B60R 1/29* | (2022.01) |
| *G06T 7/00* | (2017.01) |
| *G06T 7/73* | (2017.01) |

(52) U.S. Cl.
CPC ............. *B60R 1/002* (2013.01); *B60R 1/28* (2022.01); *B60R 1/29* (2022.01); *G06T 7/0002* (2013.01); *G06T 7/74* (2017.01); *B60R 2300/303* (2013.01); *B60R 2300/605* (2013.01); *B60R 2300/8093* (2013.01)

(58) Field of Classification Search
CPC .. B60R 1/002; B60R 1/28; B60R 1/29; G06T 7/74
See application file for complete search history.

(56) References Cited

U.S. PATENT DOCUMENTS

| | | | |
|---|---|---|---|
| 2006/0072788 A1* | 4/2006 | Suzuki ................. | G01C 11/02 348/E7.086 |
| 2007/0070197 A1 | 3/2007 | Akatsuka | |

(Continued)

OTHER PUBLICATIONS

German Search Report from corresponding Application No. 10 2023 133 715.7, mailed on Aug. 20, 2024, 14 pages with translation.

*Primary Examiner* — Terrell M Robinson
(74) *Attorney, Agent, or Firm* — Tucker Ellis LLP

(57) ABSTRACT

A display controlling device including an image acquiring unit that acquires an image of periphery of a vehicle; a viewpoint position acquiring unit that acquires information related to eye position of an occupant; a horizontal display region setting unit that sets a horizontal display region on a horizontal reference plane parallel to the ground in real space in the input image; a vertical display region setting unit that sets a vertical display region in a vertical reference plane extending in a direction perpendicular to the ground in the input image; a ground projection range applicable rate calculating unit that calculates a ground projection range applicable rate; and a display processing unit that displays the output image on the display unit by associating the coordinates of the input image with the coordinates of the output image displayed on the display unit based on the ground projection range applicable rate.

12 Claims, 12 Drawing Sheets

(56) References Cited

U.S. PATENT DOCUMENTS

| | | | | |
|---|---|---|---|---|
| 2008/0129756 A1* | 6/2008 | Iwano | ................... | B60R 1/26 |
| | | | | 348/148 |
| 2008/0136912 A1* | 6/2008 | Iwano | ................ | G06T 1/0007 |
| | | | | 348/148 |
| 2010/0271481 A1* | 10/2010 | Hongo | ................ | B60R 1/27 |
| | | | | 348/148 |
| 2011/0013021 A1* | 1/2011 | Hongo | ................ | B60R 1/26 |
| | | | | 348/148 |
| 2013/0135310 A1* | 5/2013 | James | ................ | G06T 15/20 |
| | | | | 345/427 |
| 2014/0314336 A1* | 10/2014 | Yagi | .............. | G06T 3/12 |
| | | | | 382/282 |
| 2017/0160545 A1* | 6/2017 | Sugiyama | ........... | B60K 35/60 |
| 2022/0281317 A1 | 9/2022 | Ahn et al. | | |

\* cited by examiner

DISPLAY CONTROL DEVICE AND DISPLAY CONTROL METHOD

CROSS-REFERENCE TO RELATED APPLICATION

The present application is based on and claims priority from Japanese patent application No. 2022-210493 filed on Dec. 27, 2022, the disclosure of which is hereby incorporated by reference in its entirety.

FIELD OF THE INVENTION

The present disclosure relates to a display control device and a display control method.

BACKGROUND ART

The vehicle periphery image providing device disclosed in Patent Document 1 (JP 2007-124609A) transforms coordinates of an image captured by an imaging device and displays on a liquid crystal display the same image as if the outside of the vehicle could be seen through the installation region of the liquid crystal display from the driver's viewpoint position, based on information about the acquired viewpoint position and the installation state of the liquid crystal display. Therefore, images are displayed on the liquid crystal display as if the outside of the vehicle was visible through the liquid crystal display.

However, since the reference plane for coordinate transformation is switched to the ground or a vertical plane depending on the viewpoint position, the image displayed on the display is also switched at the same time. At this time, the driver can recognize that the image has been switched, and may experience an unnatural feel. In addition, images are displayed on the liquid crystal display based on a viewpoint position selected from a plurality of pre-stored viewpoint positions, or a viewpoint position obtained by the driver operating one of a plurality of switches. Therefore, if the driver moves their eyes to a position other than the selected viewpoint position, the scenery viewed through the window and the image on the liquid crystal display may become discontinuous.

SUMMARY

Therefore, an object of the present disclosure is to suppress the unnatural feel felt by the occupant when the occupant visually observes the image displayed on the display unit.

In order to achieve the above object, the display control device of the present disclosure includes: an image acquiring unit that acquires an image of the periphery of the vehicle as an input image; a viewpoint position acquiring unit that acquires information regarding the eye position of the occupant; a horizontal display region setting unit that sets a horizontal display region on a horizontal reference plane parallel to the ground in real space in the input image based on the eye position of the occupant; a vertical display region setting unit that sets a vertical display region on a vertical reference plane extending perpendicular to the ground in the input image based on the eye position of the occupant; a ground projection range applicable rate calculating unit that calculates the ground projection range applicable rate which is the degree to which the occupant looks downward through the display unit; and a display processing unit that displays the output image on the display unit by associating the coordinates of the input image with the coordinates of the output image displayed on the display unit based on the ground projection range applicable rate.

A display controlling method comprising the steps of: an image acquiring step that acquires an image of periphery of a vehicle as an input image; a viewpoint position acquiring step that acquires information related to eye position of an occupant; a horizontal display region setting step that sets a horizontal display region on a horizontal reference plane in a direction parallel to the ground in real space in the input image based on the eye position of the occupant; a vertical display region setting step that sets a vertical display region in a vertical reference plane extending in a direction perpendicular to the ground in the input image based on the eye position of the occupant; a ground projection range applicable rate calculating step that calculates a ground projection range applicable rate that is a degree to which the occupant looks downward through the display unit based on the eye position of the occupant; and a display processing step that displays the output image on the display unit by associating the coordinates of the input image with the coordinates of the output image displayed on the display unit based on the ground projection range applicable rate.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

EMBODIMENT 1

Figure 1:
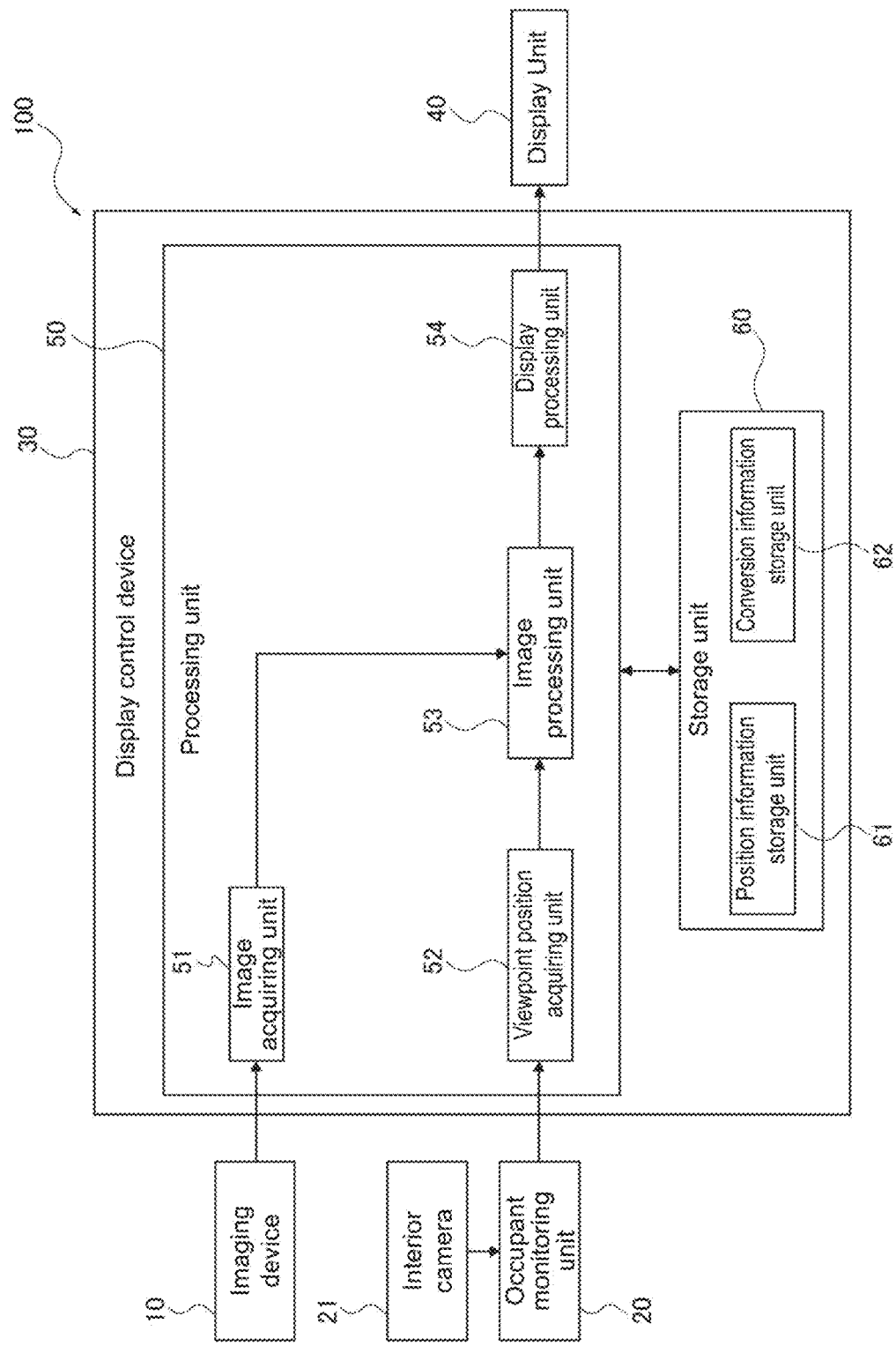
FIG. 1 is a functional block diagram depicting a schematic configuration of a display control system having a display control device according to Embodiment 1.

A display control device according to Embodiment 1 in the present disclosure will be described as follows based on the drawings. FIG. 1 is a functional block diagram depicting a schematic configuration of a display control system 100 having a display control device 30 according to Embodiment 1. The display control device 30 depicted in FIG. 1 is an embodiment of the display control device according to the present disclosure, but the present disclosure is not limited to the present embodiment. The display control device 30 is provided in a moving body such as an automobile or the like. Hereinafter, the moving body having the display control device 30 of the present embodiment will be referred to and described as the user's vehicle V (see FIG. 6).

Figure 2:
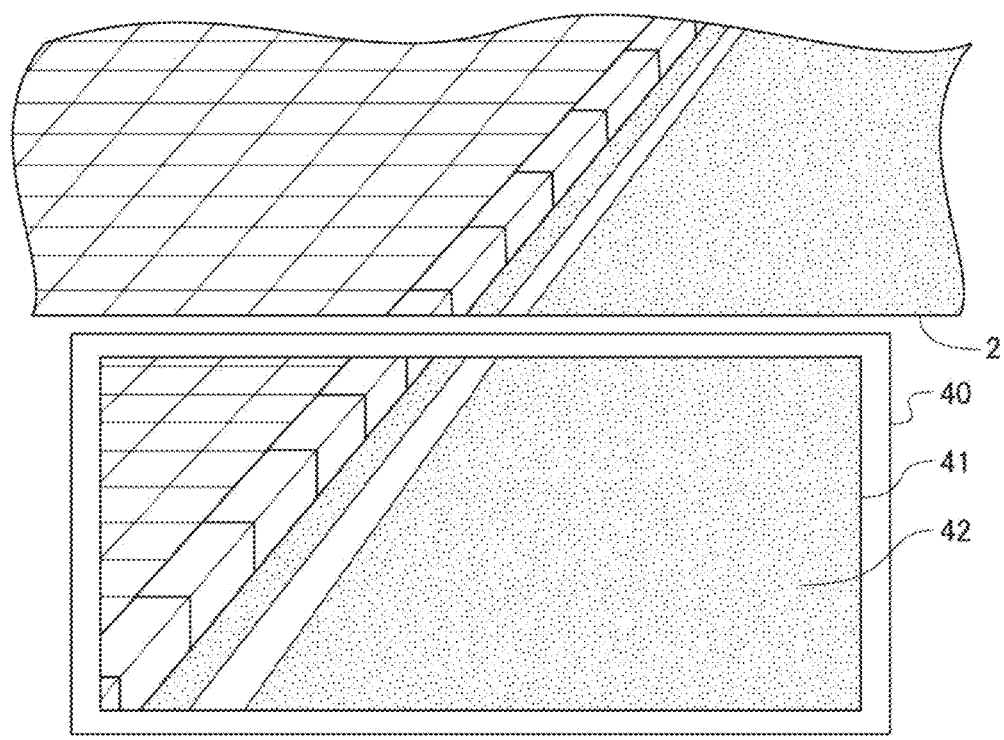
FIG. 2 is a diagram depicting an example of an output image displayed on a display unit and the periphery around the display unit.

The display control system 100 includes an imaging device 10, an occupant monitoring unit 20, in-vehicle camera 21, the display control device 30, and a display unit 40. As depicted in FIG. 2, the display control system 100 transforms an image taken by the imaging device 10 and displays the image on the display unit 40 as if the scenery outside the vehicle can be seen through the display unit 40. The display unit 40 is made of a liquid crystal display or the like, and although the display unit is a horizontally long rectangle in the present embodiment, it is not limited to being a rectangle.

The imaging device 10 is installed outside the user's vehicle V and captures an image of the periphery of the user's vehicle V. The imaging device 10 outputs the captured image to the display control device 30 as captured image data in accordance with a prescribed protocol. The imaging device 10 includes a front camera installed in the front of the vehicle V in the present embodiment. Note that the imaging device 10 is not limited to the front camera, but can also include a rear camera installed in the back of the vehicle, side cameras installed in the front and back of the user's vehicle V on left and right sides, and side cameras installed in the front and back of the user's vehicle V on left and right sides, and the like.

The occupant monitoring unit 20 is provided in the user's vehicle. The occupant monitoring unit 20 monitors the status of the driver, who is the occupant 1, based on an image captured by an in-vehicle camera 21. The occupant monitoring unit 20 can be any known type of monitoring unit. The in-vehicle camera 21 is a camera that captures an image of the interior of the vehicle, including the driver, and is installed toward the vehicle interior in the vicinity of the display unit 40, for example. Furthermore, the occupant monitoring unit 20 detects the eye position of the occupant 1 using a known technique based on the image captured by the in-vehicle camera 21 and outputs information related to the acquired eye position (hereinafter referred to as "eye position information") to the display control device 30. The eye position information can be, for example, three-dimensional coordinates of the midpoint of the left and right eyes, or the three-dimensional coordinates of the dominant eye of the occupant 1.

The display control device 30 is an information processing device that executes a process related to the creation and display of an image, and includes a processing unit (control unit) 50 and a storage unit 60, as depicted in FIG. 1. The display control device 30 is configured of, for example, an ECU having a CPU, GPU, RAM, and ROM or other storage device. The processing unit 50 is primarily configured of a CPU or the like included in the ECU and controls an overall operation of the display control device 30 by deploying a prescribed program stored in ROM to RAM and executing the program, and overall operation of a display control system 100. The storage unit 60 is primarily configured of the storage device included in the ECU but can include an externally provided server or database.

Note that the display control device 30 can be configured of a single ECU, or can be configured of a plurality of ECUs, distributing each function of the processing unit 50 described later, or distributing the data to be stored. Furthermore, a part or all of the functions of the display control device 30 can be implemented using hardware such as FPGA, ASIC, or the like. Furthermore, a single ECU can be configured to have not only a function of the display control device 30, but also the functions of a camera ECU that controls the imaging device 10 and the occupant monitoring unit 20.

The processing unit 50 associates the input image 70 (see FIG. 2, and the like) into the coordinates of the output image 42 based on the captured image data input from the imaging device 10 (input image 70, see FIG. 3, and the like) and the eye position information input from an occupant monitoring unit 20, and causes the output image 42 to be displayed on the display unit 40. As depicted in FIG. 1, the processing unit 50 functions as an image acquiring unit 51, a viewpoint position acquiring unit 52, an image processing unit 53, and a display processing unit 54, but is not limited to these functions.

The image acquiring unit 51 acquires an input image 70 of the periphery of the user's vehicle V from the imaging device 10, and outputs the image to the image processing unit 53 (image acquiring process). The viewpoint position acquiring unit 52 acquires eye position information (three-dimensional coordinates of the eye position T depicted in FIG. 4) from the occupant monitoring unit 20, and outputs the information to the image processing unit 53 (viewpoint position acquiring process). The eye position T can be considered to be the projection center for projecting and displaying the input image 70 on the display unit 40.

The image acquiring unit 51 and viewpoint position acquiring unit 52 of the present embodiment are provided in the processing unit 50 and acquire the respective information through a known input interface provided by the display control device 30. However, this configuration is not a limitation, and the image acquiring unit 51 and viewpoint position acquiring unit 52 may be the input interface itself, or may simply output the information acquired from the imaging device 10 or the occupant monitoring unit 20 to the image processing unit 53, and the required processing for the information may be performed by the image processing unit 53.

The image processing unit 53 executes image processing to transform the input image 70 from the eye position T of the occupant 1 to the image (output image 42) when viewing the periphery of the user's vehicle V based on the input image 70 input from the image acquiring unit 51 and the eye position T input from the viewpoint position acquiring unit 52. More specifically, the image processing unit 53 functions as a distortion correction processing unit that executes a distortion correcting process, a horizontal display region setting unit that executes a horizontal display region setting process, a vertical display region setting unit that executes a vertical display region setting process, a ground projection range applicable rate calculating unit that executes a ground projection range applicable rate calculating process, an internal division point calculating unit that executes an internal division point calculating process, an integrated display region setting unit that execute an integrated display region setting process, and a coordinate transforming unit that executes a coordinate transformation process.

In the present embodiment, integration is a process of outputting one region in an image based on input of two regions within the same image. The region in this process refers to the coordinates of four vertices, a quadrilateral made up of four vertices, or an image inside a quadrilateral made up of four vertices. Each vertex within a region is associated with a vertex in another region. Each vertex in the output region represents a point obtained by internally dividing the corresponding vertices in the two input regions based on an internal division ratio. The internal division ratio is common to each vertex within the region.

The image processing unit 53 corrects lens distortion (for example, lens distortion aberration, chromatic aberration, and the like) of the imaging device 10 using known techniques with respect to the input image 70 input from the image acquiring unit 51 as the distortion correcting process. Note that the distortion correcting process can be configured to be performed by the image acquiring unit 51, and the input image 70 after the distortion correcting process can be output to the image processing unit 53.

In the horizontal display region setting process, the image processing unit 53 sets a horizontal display region GA on a horizontal reference plane 71 in a direction parallel to the ground in real space in the input image 70 based on the eye position T of the occupant 1. Furthermore, in the vertical display region setting process, the image processing unit 53 sets a vertical display region WA on a vertical reference plane 81 that extends in the directions orthogonal to the ground in real space in the input image 70 based on the eye position T of the occupant 1. The details of this process are described below with reference to FIG. 3 and FIG. 4.

Figure 3:
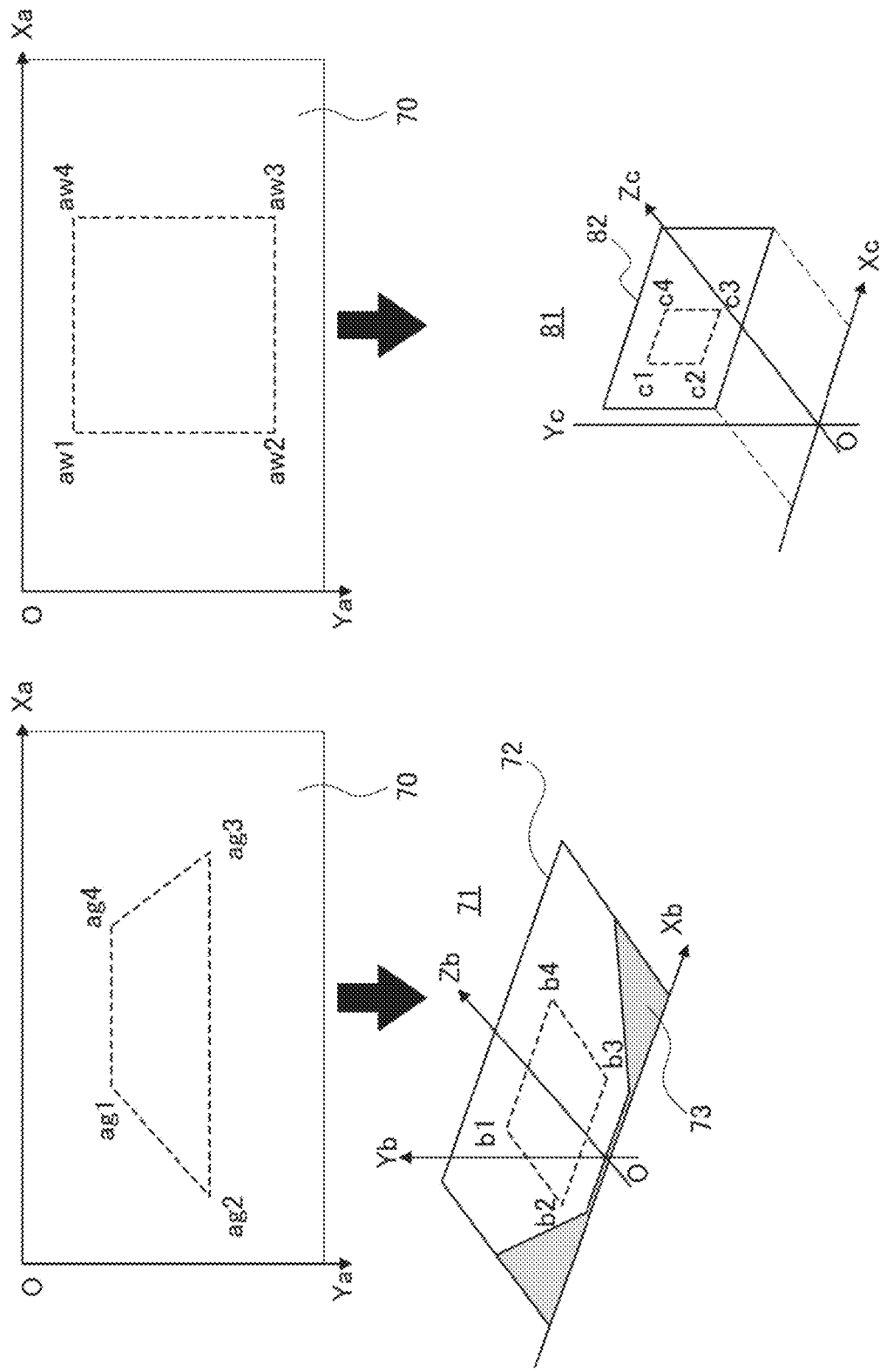
FIG. 3 is a diagram for describing a horizontal display region setting process and a vertical display region setting process executed by the image processing unit.

The coordinate system of the input image 70, the horizontal reference plane 71, and the vertical reference plane 81 will be described as follows with reference to FIG. 3. The left diagram of FIG. 3 is a horizontal reference plane 71 expressed on an image coordinate system based on the input image 70 after distortion correction and the vehicle coordinate system based on the user's vehicle V. The right diagram of FIG. 3 is a vertical reference plane 81 expressed on an image coordinate system based on the input image 70 after distortion correction and the vehicle coordinate system based on the user's vehicle V. The image coordinate system is a two-dimensional coordinate system with the origin O (0, 0) at the upper left corner of the input image 70 after the correcting process. Xa and Ya are mutually orthogonal axes, and the unit of each axis is a pixel (px).

The vehicle coordinate system is a three-dimensional coordinate system with a prescribed position of the user's vehicle V as the origin O (0, 0, 0). Xb is an axis extending in the vehicle width direction (horizontal direction), Yb is an axis orthogonal to Xb and extending in the vertical direction of the user's vehicle V, and Zb is orthogonal to Xb and Yb and is an axis extending in the front-to-back direction of the user's vehicle V. The units of the Xb, Yb, and Z axes are mm.

The region indicated by reference numeral 72 in FIG. 3 is an image in which the input image 70 is mapped onto the horizontal reference plane 71 (hereinafter referred to as "horizontal model image 72"). Furthermore, the region indicated by code 73 in FIG. 3 depicts a region where the input image 70 is not mapped, in other words, not captured by the imaging device 10 (hereinafter referred to as "non-mapped region 73"). The region indicated by reference numeral 82 in FIG. 3 is an image in which the input image 70 is mapped onto the vertical reference plane 81 (hereinafter referred to as "vertical model image 82"). The horizontal model image 72 and vertical model image 82 in FIG. 3 are virtual representations for ease of explanation, and such images are not actually created in the present embodiment. Furthermore, although the horizontal model image 72 and the vertical model image 82 have rectangular boundaries set for convenience of drawing, in reality the images have no boundaries and extend out without limit.

Figure 4:
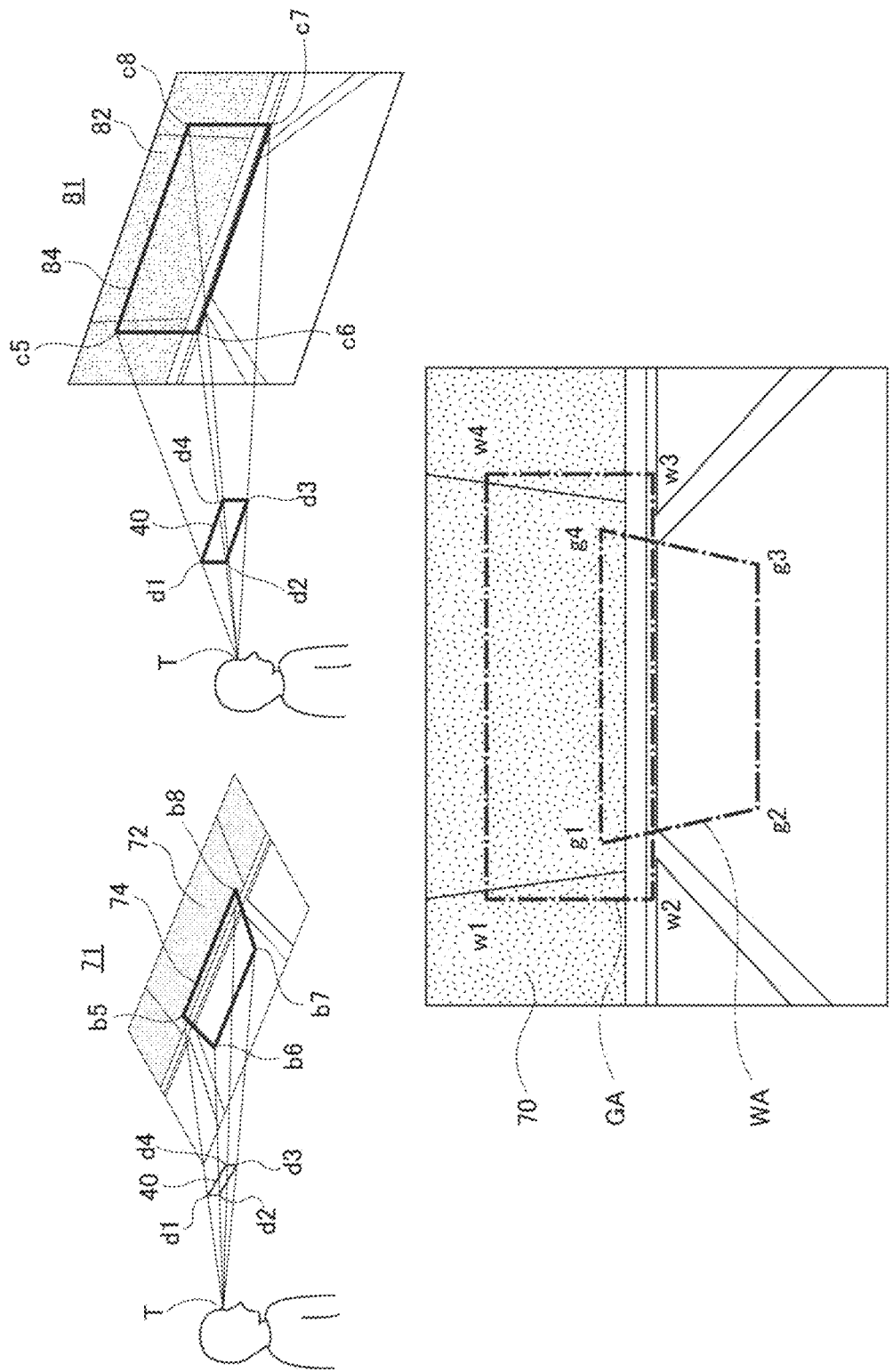
FIG. 4 is a diagram for describing a horizontal display region setting process and a vertical display region setting process executed by the image processing unit.

As depicted in the upper left hand figure of FIG. 4, the image processing unit 53 calculates the region (hereinafter referred to as "horizontal projection region 74") on the horizontal reference plane 71 that is projected onto the display region 41 of the display unit 40 when the projected plane is the display unit 40, using the eye position T as a reference. The region surrounded by points d1, d2, d3, and d4 depicted in FIG. 4 is the display region 41 of the display unit 40. In other words, points d1 to d4 are the vertices of the four corners of the rectangular display region 41. The position information (three-dimensional coordinates) of the vertices d1 to d4 is stored in advance in the position information storage unit 61 of the storage unit 60. The region bounded by reference points b5, b6, b7, and b8 on the horizontal reference plane 71 is the horizontal projection region 74 that is projected onto the display region 41. The image processing part 53 calculates the coordinates of points b5 to b8 based on the coordinates of the eye position T and the coordinates of vertices d1 to d4 acquired from the position information storage unit 61.

More specifically, as depicted in the upper left diagram of FIG. 4, the image processing unit 53 uses the coordinates T(Tx, Ty, Tz) of the eye position T and the three-dimensional coordinates in real space of the vertices d1 to d4 at the four corners of the display region 41 to set straight lines connecting the eye position T and vertices d1 to d4. Next, the image processing unit 53 detects the intersections b5 to b8 of the lines with the horizontal reference plane 71, identifies the region configured by the intersections b5 to b8 as the horizontal projection region 74 corresponding to the display region 41, and calculates the coordinates of each intersection b5 to b8.

Next, the image processing unit 53 substitutes the coordinates of each of the intersection points b5 to b8 of the horizontal projection region 74 into the right side of the following equation (1), and transforms the coordinates into the coordinates of the image coordinate system of the input image 70 after distortion correction. Points g1, g2, g3, and g4 depicted in the lower part of FIG. 4 are points on the input image 70 after coordinate transformation of the intersections b5, b6, b7, and b8 after distortion correction. The region surrounded by points g1 to g4 is a horizontal display region GA corresponding to the horizontal projection region 74 set in the input image 70 after distortion correction. In the following formula (1), $x_b$ and $z_b$ are the x and z coordinates of the horizontal reference plane 71 in the vehicle coordinate system, and $x_g$ and $y_g$ are the x coordinates and the y coordinates of the input image 70 after distortion correction in the image coordinate system. Herein, g indicates homogeneous coordinates representing coordinates $(x_g, y_g)$ in the image coordinate system, and b indicates homogeneous coordinates representing coordinates $(x_b, z_b)$ in the vehicle coordinate system. The relationship between the homogeneous coordinates g and b is expressed by the following equation (1). Note that value λg indicates the magnification at the homogeneous coordinate g. Regardless of the value of λg (except for the value 0), the same homogeneous coordinate g represents the same coordinate in the image coordinate system. The projection transformation matrix $M_G$ is calculated in advance as described below and stored in the transformation information storage unit 62 of the storage unit 60.

[Equation 1]

$$\begin{pmatrix} \lambda_g x_g \\ \lambda_g y_g \\ \lambda_g \end{pmatrix} = M_G \begin{pmatrix} x_b \\ z_b \\ 1 \end{pmatrix} \quad (1)$$

Similarly, as depicted in the upper right hand figure of FIG. 4, the image processing unit 53 calculates the region (hereinafter referred to as "vertical projection region 84") on the vertical reference plane 81 that is projected onto the display region 41 of the display unit 40 when the projected plane is the display unit 40, using the eye position T as a reference. The image processing unit 53 uses the coordinates T(Tx, Ty, Tz) of the eye position T and the three-dimensional coordinates in real space of the vertices d1 to d4 at the four corners of the display region 41 to set straight lines connecting the eye position T and vertices d1 to d4. Next, the image processing unit 53 detects the intersections c5 to c8 of the lines with the vertical reference plane 81, identifies the region configured by the intersections c5 to c8 as the vertical projection region 84 corresponding to the display region 41, and calculates the coordinates of each intersection c5 to c8.

Next, the image processing unit 53 substitutes the coordinates of each of the intersection points c5 to c8 of the vertical projection region 84 into the right side of the following equation (2), and transforms the coordinates into the coordinates of the image coordinate system of the input image 70 after distortion correction. Points w1, w2, w3, and w4 depicted in the lower diagram in FIG. 4 are points on the input image 70 after coordinate transformation of the intersections c5, c6, c7, and c8 after distortion correction. The region surrounded by points w1 to w4 is a vertical display region WA corresponding to the vertical projection region 84 set in the input image 70 after distortion correction. In the following formula (2), $x_c$ and $y_c$ are the x and y coordinates of the vertical reference plane 81 in the vehicle coordinate system, and $x_w$ and $y_w$ are the x coordinates and the y coordinates of the input image 70 after distortion correction in the image coordinate system. Herein, w indicates homogeneous coordinates representing coordinates ($x_w$, $y_w$) in the image coordinate system, and c indicates homogeneous coordinates representing coordinates ($x_c$, $y_c$) in the vehicle coordinate system. The relationship between the homogeneous coordinates w and c is expressed by the following equation (2). Note that value $\lambda_w$ indicates the magnification at the homogeneous coordinate w. Regardless of the value of $\lambda_w$ (except for the value 0), the same homogeneous coordinate w represents the same coordinate in the image coordinate system. The projection transformation matrix $M_W$ is calculated in advance as described below and stored in the transformation information storage unit 62.

[Equation 2]

$$\begin{pmatrix} \lambda_w x_w \\ \lambda_w y_w \\ \lambda_w \end{pmatrix} = M_W \begin{pmatrix} x_c \\ y_c \\ 1 \end{pmatrix} \quad (2)$$

The projection transformation matrices $M_G$ and $M_W$ are calculated by an operator at the time of shipping or during maintenance of a vehicle equipped with the system, using the following procedure with reference to FIG. 3. First, the operator defines four points b1, b2, b3, and b4 on the ground (horizontal reference plane 71) set in the vehicle coordinate system that can be captured on the input image 70, and specifies the coordinates of each point b1 to b4 by actual measurement. Next, the operator defines points corresponding to points b1, b2, b3, and b4 on the ground as ag1, ag2, ag3, and ag4 on the input image 70 after distortion correction, respectively, and specifies the coordinates of each pixel ag1 to ag4 by actual measurement. The operator inputs the coordinates of the specified points ag1 to ag4 and points b1 to b4 into the display control device 30. Thereby, the image processing unit 53 calculates a projection transformation matrix $M_G$ that transforms the coordinates of the vehicle coordinate system of the horizontal reference plane 71 to coordinates on the input image 70 after distortion correction based on the correspondence between each point b1 to b4 and each point ag1 to ag4. The image processing unit 53 stores the calculated projection conversion matrix MG in the conversion information storage unit 62. Note that the projection transformation matrix $M_G$ may be calculated by the operator and stored in the transformation information storage unit 62. The same applies to the projection transformation matrix $M_W$ described later.

In order to calculate the projection transformation matrix $M_G$ with higher accuracy, the points b1 to b4 are located in a region that the occupant 1 frequently views through the display unit 40, and the area of the rectangle composed of the points b1 to b4 is preferably larger. Furthermore, the procedure for calculating the projection transformation matrix $M_G$ is not limited to the above procedure. For example, the image processing unit 53 or the like may calculate a projection transformation matrix $M_G$ that minimizes the error in the correspondence based on five or more corresponding points.

Next, the operator defines four points c1, c2, c3, and c4 on a wall surface (vertical reference plane 81) set in the vehicle coordinate system, which are points captured on the input image 70, and specifies the coordinates of each point c1 to c4 by actual measurement. Next, the operator defines points corresponding to points c1, c2, c3, and c4 on the wall as aw1, aw2, aw3, and aw4 on the input image 70 after distortion correction, respectively, and specifies the coordinates of each pixel aw1 to aw4 by actual measurement. The operator creates a projection transformation matrix $M_W$ for transforming coordinates on the vertical reference plane 81 of the vehicle coordinate system to coordinates on the input image 70 after distortion correction, based on the corresponding relationship between each point c1 to c4 and each point aw1 to aw4. The calculated projection transformation matrix $M_W$ is stored in the transformation information storage unit 62.

In order to calculate the projection transformation matrix $M_W$ with higher accuracy, the points c1 to c4 are located in a region that the occupant 1 frequently views through the display unit 40, and the area of the rectangle composed of the points c1 to c4 is preferably larger. Furthermore, the procedure for calculating the projection transformation matrix $M_W$ is also not limited to the above procedure. The image processing unit 53 or the like may calculate a projection transformation matrix $M_W$ that minimizes the error in the correspondence based on five or more corresponding points.

The ground projection range applicable rate calculating process will be described as follows with reference to FIG.

Figure 5:
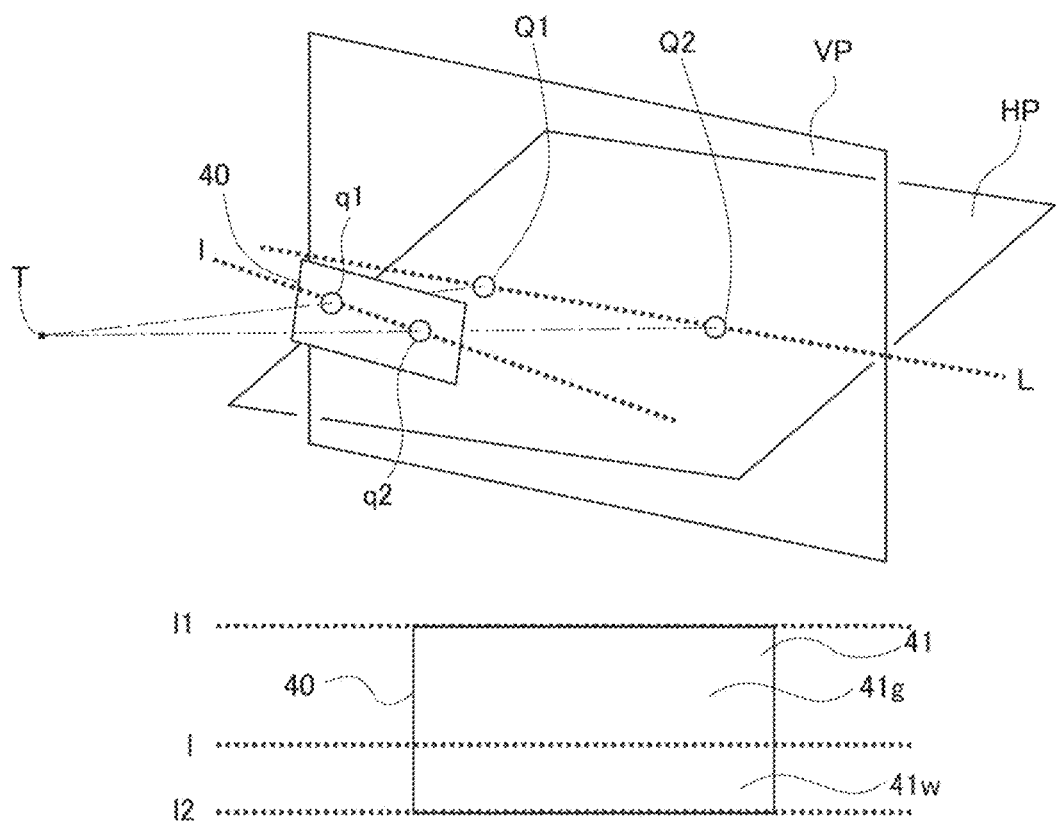
FIG. 5 is a diagram for describing a ground projection range applicable rate calculating process executed by the image processing unit.
Figure 6:
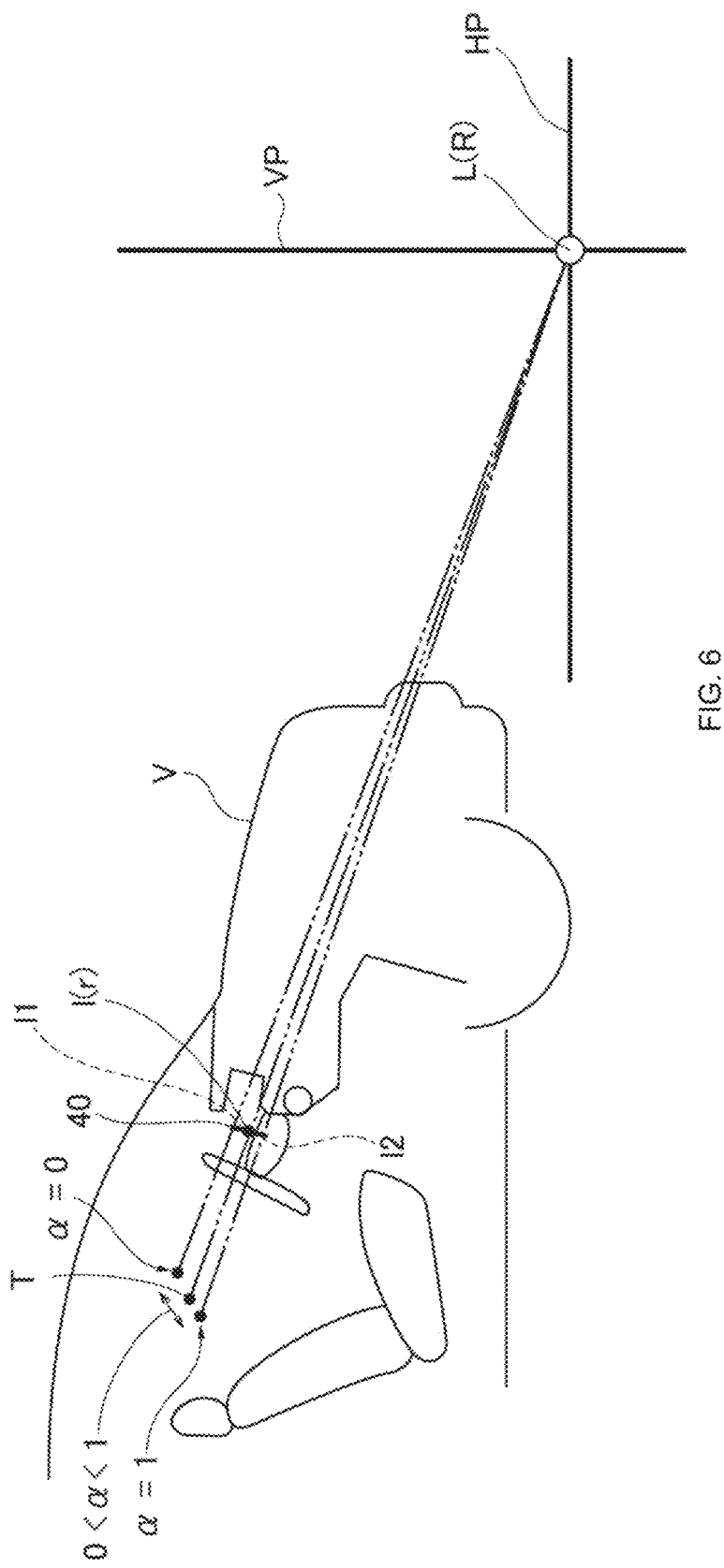
FIG. 6 is a diagram for describing a ground projection range applicable rate calculating process executed by the image processing unit.

5 and FIG. 6. FIG. 5 is a diagram describing the ground projection range applicable rate calculating process executed by the image processing unit 53, and depicts the positional relationship between the eye position T, the display unit 40, and the intersection line L between the horizontal plane HP and the vertical plane VP. The image processing unit 53 uses a coordinate system in real space to detect an intersection line L between the horizontal plane HP where the horizontal reference plane 71 is set and the vertical plane VP where the vertical reference plane 81 is set. The horizontal plane HP and the vertical plane VP are planes that extend infinitely, regardless of the eye position T of the occupant 1.

The image processing unit 53 connects arbitrary points Q1 and Q2 set on the intersection line L and the eye position T, and calculates two straight lines depicted by virtual lines in FIG. 5 using a known method. The image processing unit 53 calculates the coordinates of the intersection points q1 and q2 between each calculated straight line and the infinitely expanded display region 41, and connects the intersection points q1 and q2 to form an intersection line l on the display region 41 using a known method. The intersection line l is a line corresponding to the intersection line L on the display region 41, or in other words, a projected intersection line where the intersection line L is projected onto the display region 41. Note that the intersection line L and the intersection line l are not lines that are actually displayed in the real space and the display region 41, but for ease of understanding, a portion where the horizontal plane HP and the vertical plane VP intersect and a portion on the display region 41 corresponding to this portion are depicted as virtual lines.

The intersection line l is a line for determining the balance (distribution ratio) between the horizontal display region GA and the vertical display region WA projected onto the display region 41. The region above the intersection line l is a region onto which the horizontal plane HP is projected, and will be referred to as the "ground projection range 41g". On the other hand, the region below the intersection line l is a region onto which the vertical plane VP is projected, and will be referred to as a "wall surface projection range 41w".

Figure 7:
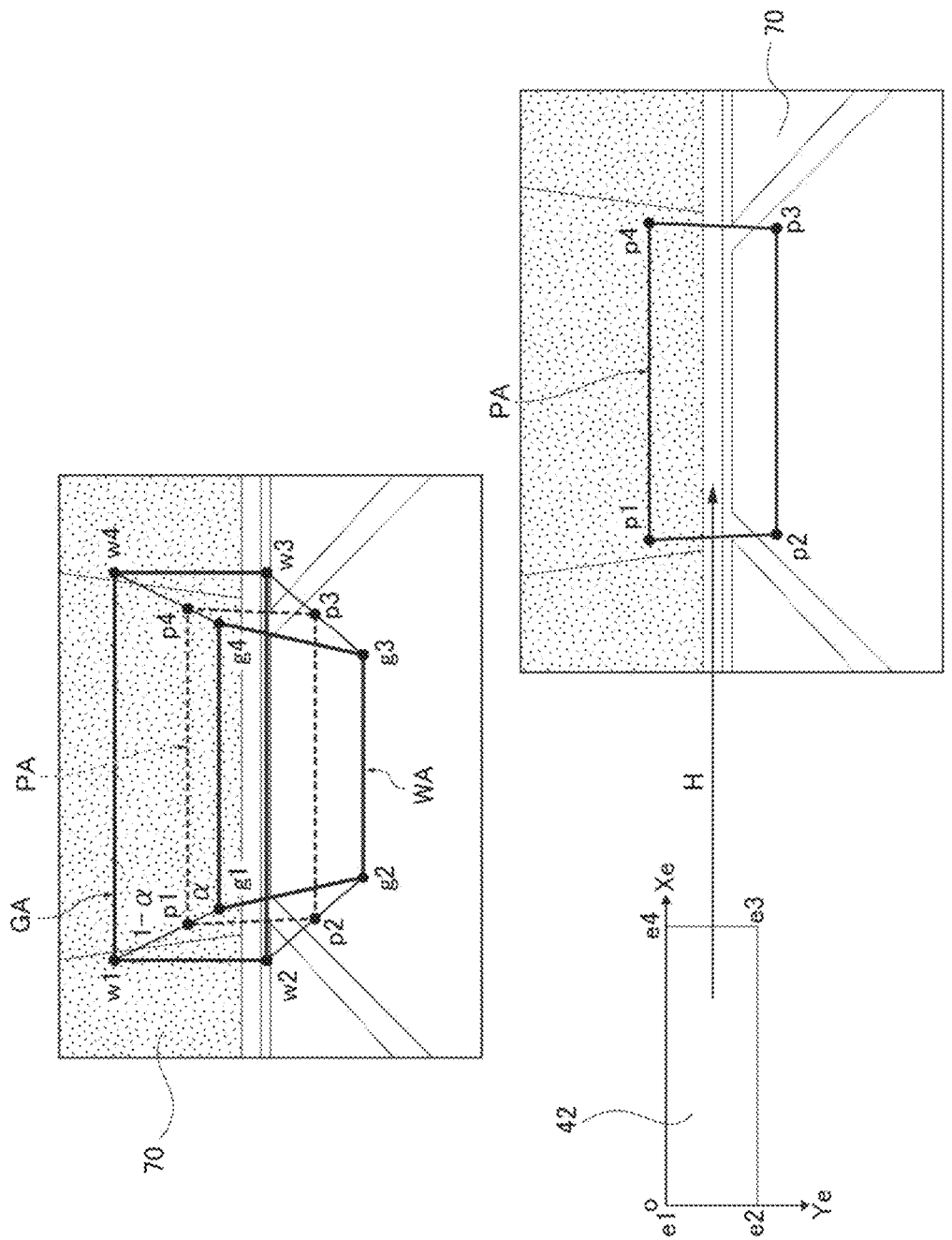
FIG. 7 is a diagram for describing the internal division point calculating process and the integrated display region setting process executed by the image processing unit.

Furthermore, the intersection line l moves according to the eye position T of the occupant 1 (refer to l, l1, and l2 of the bottom diagram in FIG. 5 and FIG. 6). When the occupant 1 looks further toward the ground near the user's vehicle V through the display unit 40, or in other words, when the occupant 1 looks lower, the eye position T will be higher or more forward, so the intersection line l will move upward in the display region 41. Thereby, the image originating from the horizontal display region GA is displayed in the display region 41 with priority over the image originating from the vertical display region WA. On the other hand, when the occupant 1 looks away from the vicinity of the user's vehicle V through the display unit 40, or in other words, when the occupant 1 looks more forward (in the direction of travel), the eye position T will be lower or rearward, so the intersection line l moves downward in the display region 41. Thereby, the image originating from the vertical display region WA is displayed in the display region 41 with priority over the image originating from the horizontal display region GA. At this time, for example, an image in which the horizontal display region GA and the vertical display region WA are divided by the intersection line l is not displayed. As will be described later, the intersection line l is used, for example, to determine the ground projection range applicable rate α. As depicted in FIG. 7, the image derived from the horizontal display region GA and the image derived from the vertical display region WA are integrated based on the value of the ground projection range applicable rate α. In the image after integration, α represents a value that determines whether an image more similar to the horizontal display region GA (an image containing more coordinates derived from the horizontal display region GA in the input image 70) will be displayed, or an image more similar to the vertical display region WA (an image containing more coordinates derived from the vertical display region in the input image 70) will be displayed.

Next, the image processing unit 53 generates a ground projection range applicable rate α (hereinafter sometimes simply referred to as "ground applicable rate α"). The ground applicable rate α is the degree to which the occupant 1 looks at the ground near the user's vehicle V through the display unit 40, or in other words, the degree to which the occupant 1 looks downward, and is also the ratio at which the ground projection range 41g occupies the display region 41. In the present embodiment, the ground applicable rate α is calculated based on the region of the ground (region of the ground projection range 41g) displayed on the display unit 40 when the occupant 1 looks downward; however, this method is not a limitation.

A larger value for the ground applicable rate α indicates a higher degree to which the occupant 1 looks toward the ground. Therefore, images derived from the ground, or in other words, the horizontal display region GA, are displayed in the display region 41 with priority over images derived from the vertical display region WA. On the other hand, a smaller value for the ground applicable rate α indicates a higher degree to which the occupant 1 looks away. Therefore, images derived from the wall surface, or in other words, the vertical display region WA, are displayed in the display region 41 with priority over images derived from the horizontal display region GA. In the present embodiment, α changes within the range of $0 \leq \alpha \leq 1$. If the ground applicable rate is α, the degree to which the occupant 1 sees through the display unit 40 away from the ground near the user's vehicle V, or in other words, the wall projection range applicable rate is expressed as $1-\alpha$. In other words, the relationship (region ratio) between the ground projection range 41g and the wall projection range 41w is expressed as "ground projection range 41g: wall projection range $41w=\alpha:1-\alpha$". Note that in the present embodiment and in embodiment 2 described later, α can be changed within a range of $0 \leq \alpha \leq 1$; however, α is not limited to this range, and α may vary within a range other than $0 \leq \alpha \leq 1$. In this case, in the subsequent processing, α is converted to α' having a range of $0 \leq \alpha' \leq 1$, and this α' is regarded as the ground applicable rate.

As depicted in FIGS. 5 and 6, when $\alpha=1$, that is, when the intersection line is at the position l1, the area of the wall projection range 41w is considered to be 0, and an image derived 100% from the horizontal display region GA is displayed in the display region 41. On the other hand, when $\alpha=0$, that is, when the intersection line is at position l2, the area of the ground projection range 41g is considered to be 0, and the display region 41 displays an image derived 100% from the vertical display region WA. Within the range of $0<\alpha<1$, the display unit 40 displays an image in which the image derived from the horizontal display region GA and the image derived from the vertical display region WA are integrated with a distribution ratio of $\alpha:1-\alpha$.

Incidentally, the inclination of the intersection line l changes depending on the placement angle of the display unit 40 with respect to the intersection line L. If the display unit 40 is placed parallel to the intersection line L, the intersection line l becomes a line parallel to the upper side of the display region 41, as depicted in the lower diagram in FIG. 5. On the other hand, if the display unit 40 is arranged obliquely with respect to the horizontal plane HP, the intersection line l will be an oblique line with respect to the upper side of the display region 41. The balance between the ground projection range 41*g* and the wall projection range 41*w* also changes depending on the slope of the intersection line l. Therefore, the image processing unit 53 of the present embodiment calculates two points q1 and q2 where the display region 41 intersects a line connecting the eye position T and two points Q1 and Q2 on the intersection line L, and calculates the intersection line l. The ground applicable rate α is calculated based on the area ratio of the ground projection range 41*g* and the wall projection range 41*w*.

Note that if the upper and lower sides of the display region 41 are parallel to the intersection line L, the region ratio between the ground projection range 41*g* and the wall projection range 41*w* can be calculated using a simpler method. As depicted in FIG. 6, the image processing unit 53 calculates the intersection point R between the horizontal plane HP and the vertical plane VP in a side diagram from the x direction, and calculates the intersection point r as a line connecting this intersection point and the eye position T. The image processing unit 53 can more easily calculate α:1−α based on the ratio of line segments (sides of the display region 41) divided by the intersection point r.

Figure 8:
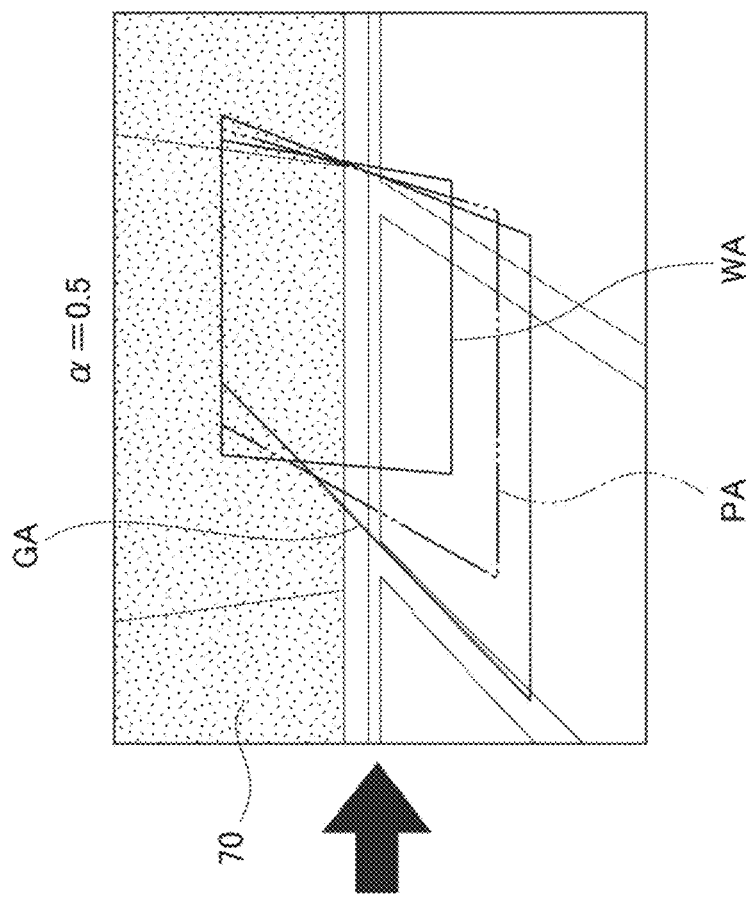
FIG. 8 is a diagram for describing the relationship between the horizontal display region, vertical display region, and integrated display region on the input image when the ground applicable rate $\alpha=0.5$.
Figure 8:
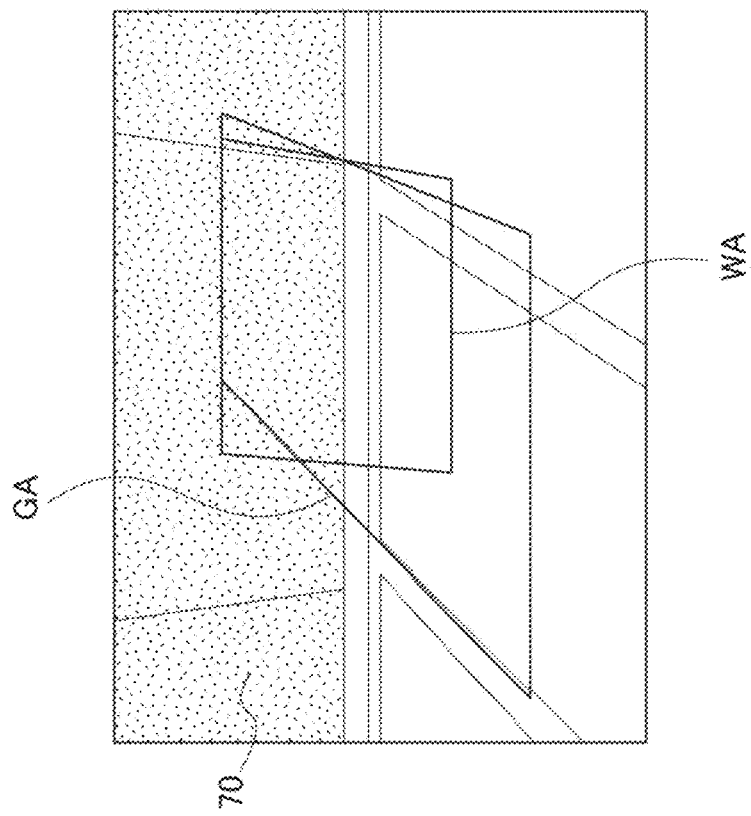

Next, the image processing unit 53 uses the ground applicable rate α to execute an internal division point calculating process. Specifically, as depicted in the top diagram of FIG. 7, the image processing unit 53 calculates four coordinates of the internal division points p (p1 to p4) expressed by the ratio α:(1−α) with regard to four points g (g1 to g4) and w (w1 to w4) that constitute the horizontal display region GA and the vertical display region WA on the input image 70 after distortion correction. The image processing unit 53 sets a region surrounded by these four internal division points p1 to p4 as an integrated display region PA during the integrated display region setting process. This integrated display region PA is a region where the image of the horizontal display region GA and the image of the vertical display region WA are integrated at a distribution ratio corresponding to the degree to which the occupant 1 looks toward the ground. Furthermore, FIG. 8 is a diagram for describing the horizontal display region GA, vertical display region WA, and integrated display region PA on the input image 70 after distortion correction when the ground applicable rate α=0.5. The left diagram of FIG. 8 is a virtual representation of the state before the integrated display region PA is set, and the right diagram of FIG. 8 is a virtual representation of the state after the integrated display region PA is set. The frame of each region is not actually set on the input image 70.

As a coordinate transformation process, the image processing unit 53 first calculates a projection transformation matrix H that transforms the coordinates of the four corner vertices of the output image 42 into the coordinates of each point p1 to p4 of the integrated display region PA. The calculation process of the projection conversion matrix H is described below, with reference to the lower left-hand diagram in FIG. 7. The bottom diagram of FIG. 7 is a diagram showing a display coordinate system based on the display region 41 of the display unit 40 and an integrated display region PA on the input image 70 after distortion correction. The display coordinate system is a two-dimensional coordinate system with the origin O (0, 0) at the upper left corner of the display region 41. Xe and Ye are mutually orthogonal axes, and the unit of each axis is a pixel (px).

The image processing unit 53 calculates a projection transformation matrix H that transforms the coordinates on the output image 42 to the coordinates on the input image 70 after distortion correction by a known calculation procedure based on the corresponding relationship between the coordinates of the four corner vertices e1, e2, e3, and e4 on the output image 42 in the display coordinate system and the internal division points p1, p2, p3, and p4 on the input image 70 after distortion correction. The image processing unit 53 stores the calculated projection conversion matrix H in the conversion information storage unit 62.

Furthermore, when the image processing unit 53 uses the calculated projection transformation matrix H to calculate from the matrix D, where D is a matrix in which the coordinates of all pixels of the output image 42 displayed in the display region 41 are arranged horizontally, the transformation into a matrix D' in which the coordinates on the input image 70 before distortion correction corresponding to each coordinate included in the matrix D are arranged horizontally is calculated using the following equation (4). In the following equation (4), f is a known function that transforms the coordinates of a pixel on the input image 70 after distortion correction to the coordinates of a pixel on the input image 70 before distortion correction.

$$D' = f(HD) \qquad (4)$$

The image processing unit 53 also uses D' to substitute the pixel value of each pixel on the input image 70 corresponding to each pixel for the pixel values of all pixels with regard to all of the pixels on the output image 42 displayed in the display region 41, and performs an image transformation process. By the above process, the image processing unit 53 generates image data of the output image 42 corresponding to the image of the integrated display region PA on the input image 70. The image processing unit 53 outputs the generated image data to the display processing unit 54.

The display processing unit 54 causes an output image 42 corresponding to the image data input from the image processing unit 53 to be displayed on the display region 41 of the display unit 40 so that the same output image 42 is displayed on the display unit 40 as if the outside of the vehicle is seen through the display unit 40.

The storage unit 60 temporarily or non-temporarily stores a control program for operating the display control device 30 and various data and parameters used in various operations in the processing unit 50. Furthermore, as described above, the position information storage unit 61 temporarily or non-temporarily stores the coordinates of the vertices d1 to d4 at the four corners of the display region 41. The transformation information storage unit 62 temporarily or non-temporarily stores projection transformation matrices $M_G$, $M_W$, H, and the like that are calculated or used during image processing.

Figure 9:
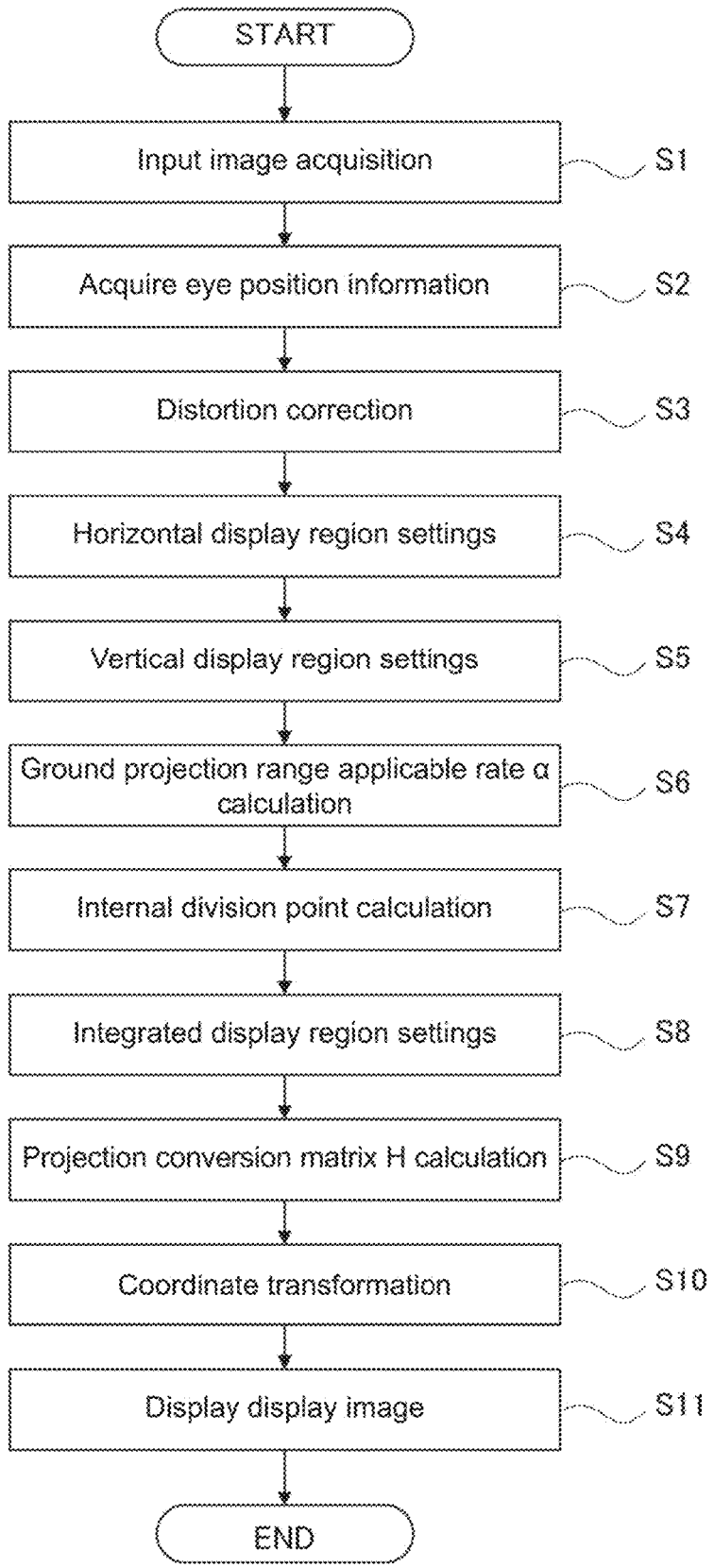
FIG. 9 is a flowchart for describing an example of an operation of the display control device according to Embodiment 1.

An example of an operation of the display control system 100 according to Embodiment 1 with the configuration described above is described below, with reference to the flowchart in FIG. 9. FIG. 9 depicts an example of the operation of the display control device 30, but the operation of the display control device 30 is not limited to the operation in FIG. 9.

First, in step S1, the image acquiring unit 51 acquires the input image 70 from the imaging device 10 and outputs the image to the image processing unit 53. Furthermore, in Step S2, the viewpoint position acquiring unit 52 acquires eye position information of the occupant 1 from the occupant monitoring unit 20 and outputs the information to the image processing unit 53.

In the subsequent step S3, the image processing unit 53 performs the distortion correcting process to correct lens distortion with respect to the input image 70. Instead of performing step S3, the input image 70 may be transformed to the output image 42 by performing transformation including distortion correction processing based on the above equation (4) in step S9. In the next step S4, the image processing unit 53 detects the intersection points b5 to b8 with the horizontal reference plane 71 based on the three-dimensional coordinates of the eye position T and the three-dimensional coordinates of the vertices d1 to d4 at the four corners of the display region 41, and sets a horizontal projection region 74 on the horizontal reference plane 71. The image processing unit 53 also substitutes the coordinates of the intersections b5 to b8 into the right side of the above-mentioned equation (1), transforms the coordinates into coordinates of the image coordinate system of the input image 70 after distortion correction, and sets the horizontal display region GA in the input image 70.

In the next step S5, the image processing unit 53 detects the intersection points c5 to c8 with the vertical reference plane 81 based on the three-dimensional coordinates of the eye position T and the three-dimensional coordinates of the vertices d1 to d4 at the four corners of the display region 41, and sets a vertical projection region 84 on the vertical reference plane 81. The image processing unit 53 also substitutes the coordinates of the intersections c5 to c8 into the right side of the above-mentioned equation (2), transforms the coordinates into coordinates of the image coordinate system of the input image 70 after distortion correction, and sets the vertical display region WA in the input image 70.

In the next step S6, the image processing unit 53 calculates the coordinates of intersection points q1 and q2 between the display region 41 of the display unit 40 and 2 lines connecting arbitrary points Q1 and Q2 set on the intersection line L between the horizontal plane HP and the vertical plane VP and the eye position T, respectively. The image processing unit 53 calculates the ground projection range applicable rate α based on the intersection line l calculated by connecting the intersection points q1 and q2, and calculates the area ratio between the ground projection range 41g and the wall projection range 41w on the display region 41 as α:1−α.

In the next step S7, the image processing unit 53 calculates four coordinates of the internal division points p (p1 to p4) expressed by the ratio α:(1−α) with regard to four points g (g1 to g4) and w (w1 to w4) that constitute the horizontal display region GA and the vertical display region WA on the input image 70 after distortion correction. In the next step S8, the image processing unit 53 sets the region surrounded by the four calculated internal division points p1 to p4 as the integrated display region PA.

In the next step S9, the image processing unit 53 calculates the projection transformation matrix H that transforms the coordinates of the four corner vertices e1 to e4 of the output image 42 in the display coordinate system to the coordinates of each point p1 to p4 of the integrated display region PA calculated in step S7, and stores the projection transformation matrix in the transformation information storage unit 62. In the next step S10, the image processing unit 53 uses the projection transformation matrix H calculated in step S9 and the above equation (4) to generate the image data of the output image 42 by transforming all of the image coordinates of the output image 42 to coordinates of pixels on the corresponding input image 70, and output to the display processing unit 54.

In the following Step S11, the display processing unit 54 causes the output image 42 corresponding to the image data input from the image processing unit 53 in Step S10 to be displayed on the display region 41 of the display unit 40. As described above, an output image 42 in which an image derived from the horizontal display area GA and an image derived from the vertical display area WA are integrated is displayed in the display region 41 in accordance with the degree to which the occupant 1 looks toward the ground.

Embodiment 2

The display control device 30 and display control system 100 of the second embodiment of the present disclosure have the same basic configuration and function as the display control device 30 and the display control system 100 of Embodiment 1 depicted in FIG. 1, except that a portion of the function of the image processing part 53 is different. Therefore, a detailed description of configurations and functions of Embodiment 2 that are the same as the Embodiment 1 is omitted.

In the display control device 30 of the second embodiment, similar to the first embodiment, the image acquiring unit 51 acquires the input image 70 from the imaging device 10 and outputs the image to the image processing unit 53, and the viewpoint position acquiring unit 52 acquires the eye position information from the occupant monitoring unit 20 and outputs the information to the image processing unit 53.

Herein, the image processing unit 53 of the first embodiment functions as a distortion correction processing unit, a horizontal display region setting unit, a vertical display region setting unit, a ground projection range applicable rate calculating unit, an internal division point calculating unit, an integrated display region setting unit, and a coordinate transforming unit. The image processing unit 53 calculates the projection transformation matrices $M_G$ and $M_W$ in advance, and uses the above equations (1) and (2) and the ground applicable rate α to set the integrated display region PA including the coordinates of the horizontal display region GA and the coordinates of the vertical display region WA into the input image 70 after distortion correction. Next, the image processing unit 53 calculates a projection transformation matrix H, and transforms the coordinates of the output image 42 into coordinates within the integrated display region PA in the input image 70.

In contrast, the image processing unit 53 of the second embodiment functions as a distortion correction processing unit, a horizontal display region setting unit, a vertical display region setting unit, a ground projection range applicable rate calculating unit, an internal division point calculating unit, and a coordinate transforming unit, but also functions as a matrix calculating unit that executes matrix calculating process in place of the integrated display region setting unit. The image processing unit 53, as a matrix calculating unit, calculates a projection transformation matrix H that transforms each point on the display coordinate system on the output image 42 to a point on the image coordinate system on the input image 70 after distortion correction, with regard to the horizontal reference plane 71 and the vertical reference plane 81. The projection transformation matrices for the horizontal reference plane 71 and the vertical reference plane 81 will be referred to as horizontal transformation matrix G and vertical transformation matrix W, respectively.

The horizontal transformation matrix G and the vertical transformation matrix W are calculated by the following procedures. First, using the same procedure as in the first embodiment, a projection transformation matrix $M_G$ that transforms the coordinates on the horizontal reference plane 71 of the vehicle coordinate system to the coordinates on the input image 70 is calculated based on the corresponding relationship of the coordinates of four points b1, b2, b3, and b4 on the horizontal reference plane 71 set in the vehicle coordinate system and the coordinates of points ag1, ag2, ag3, and ag4 in the image coordinate system of the input image 70 after distortion correction (see FIG. 3 above), using actual measurements.

Next, the image processing unit 53 detects the intersection points b5 to b8 of the horizontal reference plane 71 based on the three-dimensional coordinates of the eye position T and the three-dimensional coordinates of the four corner vertices d1 to d4 of the display region 41 using the same procedure as in the first embodiment.

Next, a projection transformation matrix $N_G$ that transforms the coordinates on the output image 42 of the display coordinate system to the coordinates on the horizontal reference plane 71 of the vehicle coordinate system is calculated, and the calculation procedures are described below while referencing FIG. 10 and FIG. 4. The image processing unit 53 calculates the projection transformation matrix $N_G$ using commonly known calculation procedures from the corresponding relationship between the coordinates of the four corner vertices e1, e2, e3, and e4 on the output image 42 depicted in the top diagram of FIG. 10 and the coordinates of points b5, b6, b7, and b8 on the vehicle coordinate system that forms the horizontal projection region 74 which is the display target on the display unit 40. At this time, the y coordinates of points b5 to b8 are always 0, so the image processing unit 53 ignores this dimension.

Furthermore, using the same procedure as in the first embodiment, the image processing part 53 calculates the projection transformation matrix $M_W$ that transforms the coordinates on the vertical reference plane 81 of the vehicle coordinate system to the coordinates on the input image 70 as calculated based on the corresponding relationship of the coordinates of four points c1, c2, c3, and c4 on the vertical reference plane 81 set in the vehicle coordinate system and the coordinates of points aw1, aw2, aw3, and aw4 on the input image 70 after distortion correction (see FIG. 3 above), using actual measurements.

Next, the image processing unit 53 detects the intersection points c5 to c8 of the vertical reference plane 81 based on the three-dimensional coordinates of the eye position T and the three-dimensional coordinates of the four corner vertices d1 to d4 of the display region 41 using the same procedure as in the first embodiment.

Figure 10:
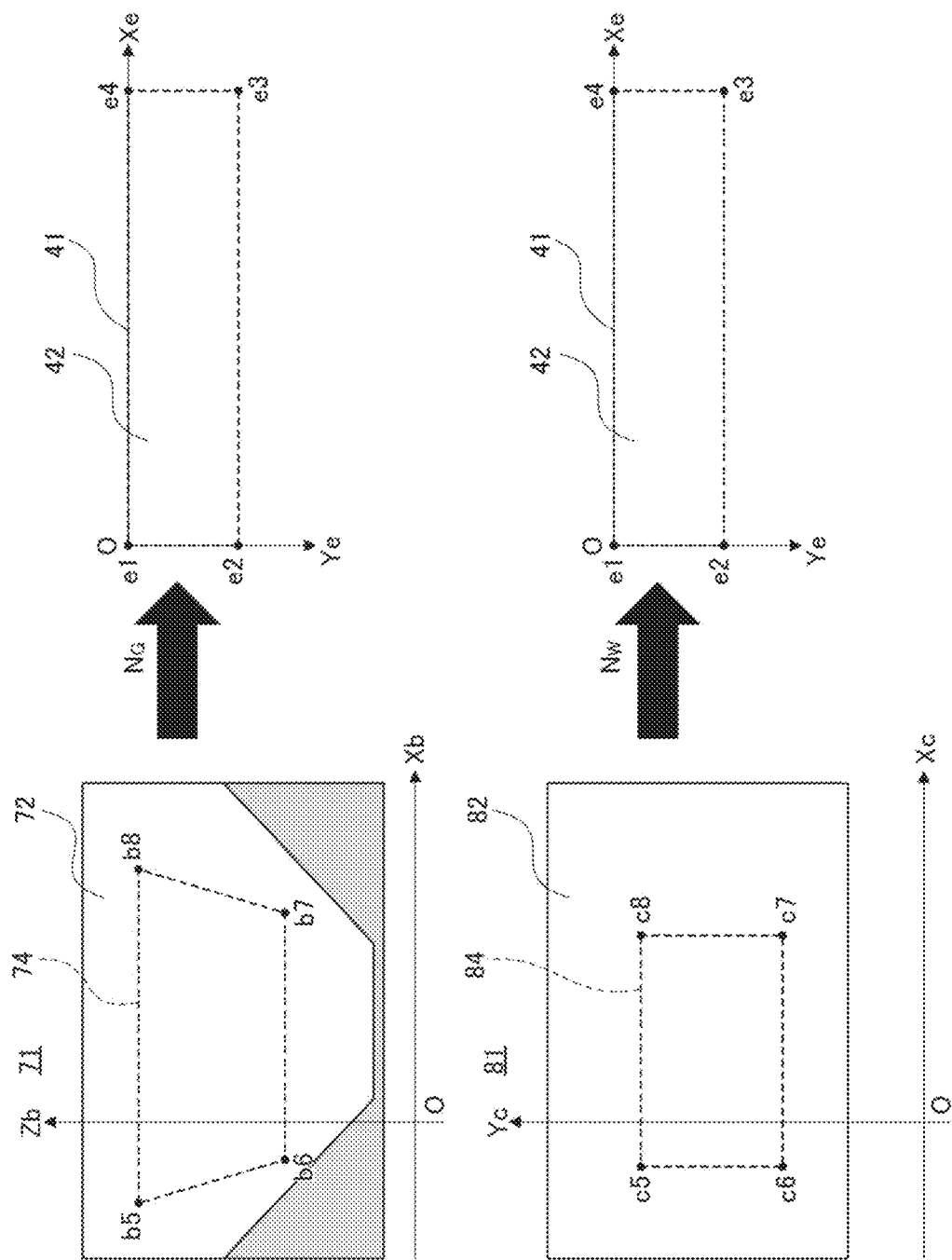
FIG. 10 is a diagram for describing the image processing executed by the imaging processing unit of the display control device according to Embodiment 2.

Next, the image processing unit 53 calculates using a known calculation method a projection transformation matrix $N_W$ that transforms the coordinates on the vertical reference plane 81 of the vehicle coordinate system from the coordinates on the output image 42 based on the corresponding relationship between coordinates of the four corner vertices e1, e2, e3, and e4 on the output image 42 depicted in the lower diagram of FIG. 10 and the coordinates of points c5, c6, c7, and c8 on the vehicle coordinate system that form the vertical projection region 84 that is the display target to the display unit 40. At this time, if the vertical reference plane 81 is parallel to the XcYc plane, the z coordinates of points c5 to c8 will always be constant, so the image processing unit 53 ignores this dimension. On the other hand, if the vertical reference plane 81 is not parallel to the XcYc plane, the image processing unit 53 rotates the vehicle coordinate system so that the vertical reference plane 81 is parallel to the XcYc plane, and then calculates the projection transformation matrix $N_W$.

The image processing unit 53 calculates a horizontal transformation matrix G ($G=M_G N_G$) based on the calculated projection transformation matrices $M_G$ and $N_G$, and stores the horizontal transformation matrix in the transformation information storage unit 62. The image processing unit 53 calculates a vertical transformation matrix W ($W=M_W N_W$) based on the calculated projection transformation matrices $M_W$ and $N_W$ and stores the vertical transformation matrix in the transformation information storage unit 62. The top diagram of FIG. 11 depicts the relationship between the region on the display coordinate system of the output image 42, and the horizontal display region GA and the display region WA in the image coordinate system of the input image 70, in order to ease understanding of image processing in the second embodiment.

Next, the image processing unit 53 calculates the ground applicable rate $\alpha$ based on the eye position T and the intersection line L between the horizontal plane HP and the vertical plane VP, using the same procedures as in the first embodiment. The image processing unit 53 calculates $\alpha:1-\alpha$ which is the ratio for calculating the internal divided coordinates of the coordinates of the pixels in the horizontal display region GA obtained by applying the horizontal transformation matrix G and the coordinates of the pixels in the vertical display region WA obtained by applying the vertical transformation matrix W. Furthermore, if D is a matrix in which the coordinates of all pixels of the output image 42 displayed in the display region 41 are arranged horizontally, the image processing unit 53 uses $\alpha$, $1-\alpha$, the horizontal transformation matrix G, and the vertical transformation matrix W to calculate the transformation from matrix D to matrix D' where the coordinates on the input image 70 are arranged horizontally corresponding to each pixel in the output image 42 using the following equation (5). In the following equation (5), f is a known function that transforms the coordinates of a pixel on the input image 70 after distortion correction to the coordinates of a pixel on the input image 70 before distortion correction.

$$D' = f(\alpha GD + (1-\alpha)WD) \quad (5)$$

Figure 11:
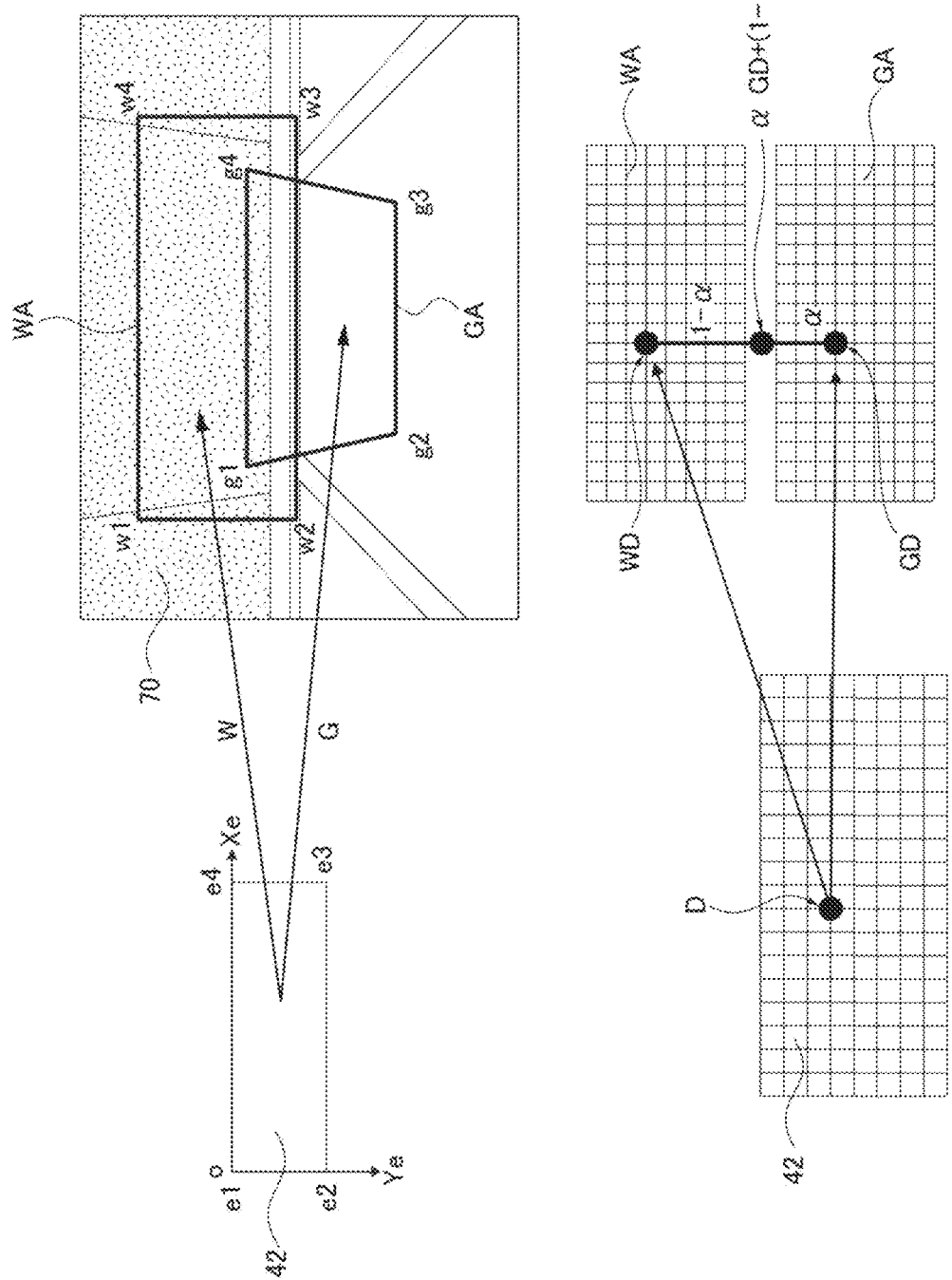
FIG. 11 is a diagram for describing the image processing executed by the imaging processing unit of the display control device according to Embodiment 2.

The lower diagram in FIG. 11 depicts a procedure for converting pixels in the matrix D of the output image 42 into pixels on the input image 70 after distortion correction using the above equation (5) for ease of understanding. The image processing unit 53 substitutes the pixels on the input image 70 corresponding to all the pixels on the output image 42 displayed in the display region 41 into the above equation (5), performs coordinate transformation, and generates the image data of the output image 42. The image processing unit 53 outputs the generated image data to the display processing unit 54. The display processing unit 54 displays an output image 42 corresponding to the image data input from the image processing unit 53 in the display region 41 of the display unit 40.

As described above, the display control device 30 of each of the above embodiments associates the input image 70 and the output image 42 based on the eye position T of the occupant 1 and the degree to which the occupant 1 looks toward the ground, and transforms to the output image 42 which is then displayed on the display unit 40. Therefore, the display control device 30 can suppress the unnatural feel of the occupant 1 when the occupant 1 visually observes the output image 42 displayed on the display unit 40. Furthermore, when the occupant 1 moves the eye position T to change the degree that the ground is viewed through the display unit 40, the output image 42 in which both images are integrated is displayed on the display unit 40 based on this degree. As a result, the display control device 30 can continue to display a naturally changing output image 42 without causing the occupant 1 to experience an unnatural feel due to the distortion being appropriately reduced. Furthermore, when a is 0 or 1, the output image 42 has an appropriate connection with the scenery seen through the front window 2, as depicted in FIG. 2, and thus the unnatural feel of the occupant 1 is more appropriately reduced.

Furthermore, the display control device 30 of the first embodiment includes an integrated display region setting unit (image processing unit 53) that sets an integrated display region PA including the coordinates of the horizontal display region GA and the coordinates of the vertical display region WA in the input image 70 based on the ground projection range applicable rate α. The display processing unit 54 transforms the coordinates of the integrated display region PA in the input image 70 into coordinates of the output image 42, and displays the output image on the display unit 40.

In addition, the display control device 30 of the first embodiment provides an internal division point calculating unit (image processing unit 53) that calculates four points g1 to g4 constituting the horizontal display region GA on the input image 70 and internal division points p1 to p4, which internally divide a line segment connecting four points w1 to w4 constituting the vertical display region WA in the input image 70 corresponding to the four points g1 to g4 on the horizontal display region GA based on the ground projection range applicable rate α. The integrated display region setting unit (image processing unit 53) sets the region surrounded by the internal division points p1 to p4 on the input image 70 as the integrated display region PA. The above configuration enables the calculation speed in the processing unit 50 to be faster, and the display control device 30 of the first embodiment can perform image conversion faster and more efficiently.

The display control device 30 of the second embodiment also includes a matrix calculating unit (image processing unit 53) that calculates the horizontal transformation matrix G that associates the coordinates of the horizontal display region GA in the input image 70 with the coordinates of the output image 42, and the vertical transformation matrix W that associates the coordinates of the vertical display region WA in the input image 70 with the coordinates of the output image 42. Furthermore, the display processing unit 54 associates the coordinates of the input image 70 and the coordinates of the output image 42 and performs control to display the coordinates on the display unit 40 based on the horizontal transformation matrix G, the vertical transformation matrix W, and the ground projection range applicable rate α.

At this time, the display processing unit 54 calculates the coordinates in the horizontal display region GA and the coordinates in the vertical display region WA of the input image 70 that correspond to the coordinates of the output image 42 based on the horizontal transformation matrix G and the vertical transformation matrix W, and associates with the coordinates of the output image 42 the coordinates in the horizontal display region GA and the coordinates in the vertical display region WA in the input image 70 with the internally divided coordinates obtained by internally dividing, based on the ground projection range applicable rate α.

With the above configuration, the display control device 30 of the second embodiment is not limited to a rectangular display unit 40, and the coordinates of pixels on the input image 70 can be converted to the coordinates of pixels on the output image 42 with high precision even when used on a display unit 40 with a shape other than a rectangle, such as trapezoids, rhombuses, scalene quadrilaterals, triangles, and polygons larger than pentagons. Therefore, the display control device 30 can display an output image 42 that can further reduce the unnatural feel of the occupant 1 on a display unit 40 of any shape.

An embodiment of the present disclosure has been described in detail with reference to the drawings, but the specific configuration is not limited to the aforementioned embodiments and design changes to a degree that do not deviate from the gist of the present disclosure are included in the present disclosure.

For example, the image processing unit 53 in each of the above embodiments specifies the coordinates of the intersection points aw1, aw2, aw3, and aw4 by actual measurement when calculating the projection transformation matrix $M_W$, but the procedure is not limited to this method. For example, as depicted in FIG. 12, the image processing unit 53 uses the positional information of the image captured by the imaging device 10 (for example, the three-dimensional coordinates of the optical center of the front camera) as a projection center F, and can specify the coordinates c1, c2, c3, and c4 on the vertical reference plane 81 to coordinates projected on the horizontal reference plane 71 by applying the projection transformation matrix $M_G$.

Figure 12:
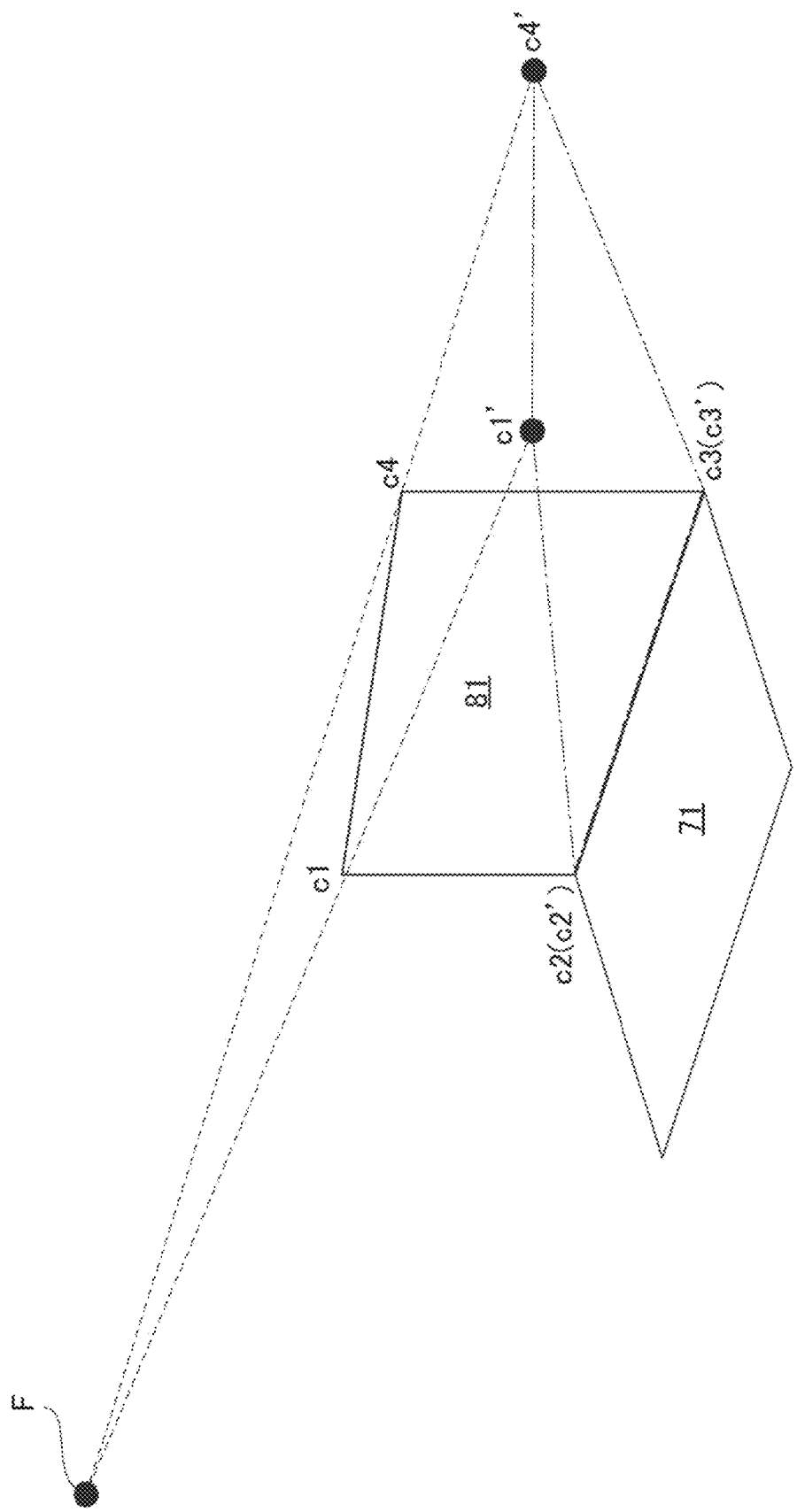
FIG. 12 is a diagram for describing another example of the ground projection range applicable rate calculating process.

More specifically, as depicted in FIG. 12, the image processing unit 53 extends the line connecting the projection center F and points c1 and c4 on the vertical reference plane 81 in the vehicle coordinate system so as to contact with the horizontal reference plane 71, detects the points c1' and c4' where the extended lines intersect with the horizontal reference plane 71, and calculates these coordinates. Similarly, the image processing unit 53 calculates the coordinates of points c2' and c3' on the horizontal reference plane 71 corresponding to points c2 and c3, but since the points c2 and c3 are points in contact with the horizontal reference plane 71, the coordinates of points c2' and c3' can use the coordinates of points c2 and c3 as is. By applying the above-mentioned equation (1) using the projection transformation matrix $M_G$ to the coordinates of the points c1' to c4' calculated as above, c1' to c4' can be transformed to coordinates on the input image 70 after distortion correction corresponding to points c1 to c4 on the vertical reference plane 81. Naturally, points c2 and c3 on the vertical reference plane 81 are not necessarily in contact with the ground, and in this case, c2' and c3' are calculated in the same manner as c1 and c4.

Furthermore, the display control device 30 of each of the embodiments described above transforms the input image 70 taken by the front camera of the imaging device 10, based on the degree to which the occupant 1 looks toward the ground, and displays the transformed image on the display unit 40, but the present invention is not limited to this configuration. For example, instead of or in addition to this configuration, the display control device 30 may have a configuration that transforms the input image taken by the rear camera based on the degree to which the occupant 1 looks toward the ground, and displays the transformed image on the display unit 40. Furthermore, the display control unit 30 can be configured to convert the input image captured by the side camera into an output image 42 corresponding to the angle of the road surface and obstacles at a forward angle to the user's vehicle V, and display the image on the display unit provided on the so-called A pillar or the like. Since the display unit provided on the A-pillar or the like is often not rectangular, the display control device 30 of the second embodiment is particularly suitable for use. Therefore, the display control device 30 can display an input image taken from the rear or an input image taken from the side of the display unit 40 based on the degree to which the occupant 1 looks toward the ground, and by visually observing the image 42, the road surface and obstacles behind and to the sides can be more appropriately understood without an unnatural feel.

What is claimed is:

1. A display controlling device comprising:
   an image acquiring unit that acquires an image of periphery of a vehicle as an input image;
   a viewpoint position acquiring unit that acquires information related to eye position of an occupant;
   a horizontal display region setting unit that sets a horizontal display region on a horizontal reference plane parallel to the ground in real space in the input image based on the eye position of the occupant;
   a vertical display region setting unit that sets a vertical display region in a vertical reference plane extending in a direction perpendicular to the ground in the input image based on the eye position of the occupant;
   a ground projection range applicable rate calculating unit that calculates a ground projection range applicable rate that is a degree to which the occupant looks downward through the display unit based on the eye position of the occupant; and
   a display processing unit that displays the output image on the display unit by associating the coordinates of the input image with the coordinates of the output image displayed on the display unit based on the ground projection range applicable rate.

2. The display controlling device according to claim 1, wherein the horizontal display region is a region when looking at the ground near the vehicle through the display unit from the eye position of the occupant, and the vertical display region is the region when looking further away than the vicinity of the vehicle through the display unit from the eye position of the occupant.

3. The display controlling device according to claim 1, wherein an integrated display region setting unit is provided that sets an integrated display region including coordinates of the horizontal display region and coordinates of the vertical display region in the input image based on the ground projection range applicable rate; and
   the display processing unit transforms the coordinates of the integrated display region in the input image into coordinates of the output image, and displays the output image on the display unit.

4. The display controlling device according to claim 3, wherein an internal division point calculating unit is provided that calculates an internal division point that internally divides a line segment connecting a plurality of points constituting the horizontal display region on the input image and a plurality of points corresponding to the plurality of points on the vertical display region constituting the vertical display region on the input image corresponding to the plurality of points on the horizontal display region, based on the ground projection range applicable rate; and
   the integrated display region setting unit sets a region encompassed by the internal division points on the input image as an integrated display region.

5. The display controlling device according to claim 1, further comprising:
   a matrix calculating unit, that determines a horizontal transformation matrix that associates the coordinates of the horizontal display region in the input image with the coordinates of the output image, and a vertical transformation matrix that associates the coordinates of the vertical display region in the input image with the coordinates of the output image,
   wherein the display processing unit associates the coordinates of the input image and the coordinates of the output image based on the horizontal transformation matrix, the vertical transformation matrix, and the ground projection range applicable rate, and performs control to display the coordinates on the display unit.

6. The display controlling device according to claim 5, wherein the display processing unit calculates coordinates within the horizontal display region and coordinates within the vertical display region of the input image that correspond to the coordinates of the output image, based on the horizontal transformation matrix and the vertical transformation matrix, and associates the internal divided coordinates obtained by internally dividing the coordinates in the horizontal display region and the coordinates in the vertical display region in the input image, with the coordinates of the output image, based on the ground projection range applicable rate.

7. A display controlling method comprising the steps of:
   an image acquiring step that acquires an image of periphery of a vehicle as an input image;
   a viewpoint position acquiring step that acquires information related to eye position of an occupant;
   a horizontal display region setting step that sets a horizontal display region on a horizontal reference plane in a direction parallel to the ground in real space in the input image based on the eye position of the occupant;
   a vertical display region setting step that sets a vertical display region in a vertical reference plane extending in a direction perpendicular to the ground in the input image based on the eye position of the occupant;
   a ground projection range applicable rate calculating step that calculates a ground projection range applicable rate that is a degree to which the occupant looks downward through the display unit based on the eye position of the occupant; and
   a display processing step that displays the output image on the display unit by associating the coordinates of the input image with the coordinates of the output image displayed on the display unit based on the ground projection range applicable rate.

8. The method according to claim 7, wherein the horizontal display region is a region when looking at the ground near the vehicle through the display unit from the eye position of the occupant, and the vertical display region is the region when looking further away than the vicinity of the vehicle through the display unit from the eye position of the occupant.

9. The method according to claim 7, further comprising:
   an integrated display region setting step that sets an integrated display region including coordinates of the horizontal display region and coordinates of the vertical display region in the input image based on the ground projection range applicable rate, wherein the display processing step transforms the coordinates of the integrated display region in the input image into coordinates of the output image, and displays the output image on the display unit.

10. The method according to claim 9, further comprising:

an internal division point calculating step that calculates an internal division point that internally divides a line segment connecting a plurality of points constituting the horizontal display region on the input image and a plurality of points corresponding to the plurality of points on the vertical display region constituting the vertical display region on the input image corresponding to the plurality of points on the horizontal display region, based on the ground projection range applicable rate, wherein the integrated display region setting unit sets a region encompassed by the internal division points on the input image as an integrated display region.

11. The method according to claim 7, further comprising:

a matrix calculating step that determines a horizontal transformation matrix that associates the coordinates of the horizontal display region in the input image with the coordinates of the output image, and a vertical transformation matrix that associates the coordinates of the vertical display region in the input image with the coordinates of the output image;

wherein the display processing step associates the coordinates of the input image and the coordinates of the output image based on the horizontal transformation matrix, the vertical transformation matrix, and the ground projection range applicable rate, and performs control to display the coordinates on the display unit.

12. The method according to claim 11, wherein the display processing step calculates coordinates within the horizontal display region and coordinates within the vertical display region of the input image that correspond to the coordinates of the output image, based on the horizontal transformation matrix and the vertical transformation matrix, and associates the internal divided coordinates obtained by internally dividing the coordinates in the horizontal display region and the coordinates in the vertical display region in the input image, with the coordinates of the output image, based on the ground projection range applicable rate.

* * * * *